US008176311B1

(12) United States Patent
Srinivasan et al.

(10) Patent No.: US 8,176,311 B1
(45) Date of Patent: May 8, 2012

(54) INITIALIZING PLATFORM-SPECIFIC FEATURES OF A PLATFORM DURING EARLY STAGES OF BOOTING THE KERNEL

(75) Inventors: Pramod Srinivasan, San Jose, CA (US); Anuranjan Shukla, Cupertino, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 377 days.

(21) Appl. No.: 12/496,382

(22) Filed: Jul. 1, 2009

Related U.S. Application Data

(60) Provisional application No. 61/146,935, filed on Jan. 23, 2009.

(51) Int. Cl.
*G06F 15/177* (2006.01)
*G06F 9/44* (2006.01)
*G06F 9/445* (2006.01)
(52) U.S. Cl. ............... 713/2; 713/1; 709/222; 717/168; 717/174
(58) Field of Classification Search .............. 713/1, 2; 709/222; 717/168, 174
See application file for complete search history.

(56) References Cited

U.S. PATENT DOCUMENTS

| 5,640,562 A * | 6/1997 | Wold et al. ................. 713/2 |
| 5,933,631 A * | 8/1999 | Mealey et al. ............... 713/2 |
| 7,007,160 B1 * | 2/2006 | Makphaibulchoke et al. ... 713/1 |
| 2004/0117338 A1 * | 6/2004 | Kennedy et al. .............. 707/1 |
| 2006/0064683 A1 * | 3/2006 | Bonsteel et al. ............ 717/162 |

* cited by examiner

Primary Examiner — Stefan Stoynov
(74) Attorney, Agent, or Firm — Shumaker & Sieffert, P.A.

(57) ABSTRACT

Techniques are described for providing a kernel with the ability to execute functions from a kernel module during processor initialization and initializing a platform using platform-specific modules. An initialization function of the platform-specific module is executed before a platform-independent phase of the kernel of the operating system is executed. In one example, a device includes a computer-readable medium that stores instructions for a platform-specific module comprising an initialization function, and instructions for an operating system comprising a kernel, wherein the kernel comprises a boot sequence comprising a platform-dependent phase and a platform-independent phase, and a processor to execute instructions stored in the computer-readable medium. The processor executes the initialization function of the platform-specific module to initialize the device during the platform-dependent phase of the kernel boot sequence, and wherein the processor executes the platform-independent phase of the kernel boot sequence after executing the initialization function of the platform-specific module.

22 Claims, 6 Drawing Sheets

INITIALIZING PLATFORM-SPECIFIC FEATURES OF A PLATFORM DURING EARLY STAGES OF BOOTING THE KERNEL

This application claims the benefit of U.S. Provisional Application No. 61/146,935, filed Jan. 23, 2009, which is hereby incorporated by reference in its entirety.

TECHNICAL FIELD

This disclosure relates to computing devices and, more particularly, to the boot-up cycle of computing devices.

BACKGROUND

Conventional computing platforms often utilize an operating system that acts as an interface between software applications and hardware devices. The operating system provides application programming interfaces (APIs) that provide functions for the software applications. The operating system receives instructions through the APIs and controls hardware devices of the computing platform, e.g., through device drivers. A kernel of an operating system generally is responsible for allocating platform resources to a process and executing the process. During execution of a process, the kernel interacts with various resources, including hardware devices, of the computing platform. The kernel must therefore be written to interact with all of the available resources of any computing platform on which the operating system is to be installed. During boot-up of the computing platform, the kernel initializes the computing platform and hardware devices thereof.

Operating systems are conventionally written to operate on many different computing platforms. Network platforms that utilize operating systems include, for example, routers, switches, security devices, firewalls, inspection devices, intrusion detection and intrusion prevention devices, web servers, database servers, e-mail servers, management devices, and other platforms. Programmers often write a single operating system that can accommodate all of these different platforms. This simplifies the task of writing the operating system because multiple variations of the entire operating system do not need to be written.

SUMMARY

In general, techniques are described for invoking platform-specific functions in loadable modules, thereby reducing the size of an operating system kernel loaded into memory for platforms that do not need a particular kernel module. In accordance with the techniques described herein, functions of one or more platform-specific modules are called during early stages of bootup of the operating system, such as during central processing unit (CPU) initialization. The functions of the platform-specific modules perform initialization procedures for the platform on which the operating system is installed during a platform-dependent phase of the boot-up cycle, and potentially other procedures after the boot-up cycle. For example, the functions of the platform-specific modules may initialize hardware devices of the platform on which the operating system is installed.

At the beginning of the boot-up cycle, e.g., after the platform is powered on, the boot loader of the platform loads the kernel and the platform-specific modules. The CPU then executes the kernel, the execution of which includes a platform-dependent phase and a platform-independent phase. During the platform-dependent phase of kernel boot-up, the kernel invokes initialization functions in the modules. These functions may initialize platform-dependent features of the platform, such as a watchdog timer of the platform and a translation lookaside buffer, which may be platform-specific. The kernel then executes the platform-independent phase of the boot-up cycle, which is common across all platforms. After the boot-up cycle of the kernel, the operating system may execute functions of the platform-specific modules to, for example, interact with a particular hardware device that is specific to the platform. In this manner, the kernel of the operating system may perform all of the boot-up procedures required by the operating system without becoming bloated by loading instructions (either as a module or in the base implementation) that are not going to be used by the kernel, which may otherwise be necessary for a conventional operating system for a particular platform.

In one example, a method includes loading a kernel of an operating system of a platform during initialization of a processor of the platform, wherein the platform comprises a computing device, loading an initialization function of a platform-specific module during initialization of the processor of the platform, wherein the initialization function of the platform-specific module is configured to initialize at least a portion of the platform, executing, by the kernel, the initialization function of the platform-specific module during a platform-dependent phase of a kernel boot sequence for the kernel, and executing, by the kernel, a platform-independent phase of the kernel boot sequence after executing the initialization function of the platform-specific module. Only after executing the function of the platform-specific module is the rest of the kernel initialized.

In another example, a device includes a computer-readable medium that stores instructions for a platform-specific module comprising an initialization function, and instructions for an operating system comprising a kernel, wherein the kernel comprises a boot sequence comprising a platform-dependent phase and a platform-independent phase, and a processor to execute instructions stored in the computer-readable medium, wherein the processor executes the initialization function of the platform-specific module to initialize the device during the platform-dependent phase of the kernel boot sequence, and wherein the processor executes the platform-independent phase of the kernel boot sequence after executing the initialization function of the platform-specific module.

In another example, a computer-readable medium, such as a computer-readable storage medium, of a platform contains instructions. The instructions cause a programmable processor to load a kernel of an operating system of the platform during initialization of the processor from a computer-readable medium of the platform, load an initialization function of a platform-specific module during initialization of the processor, wherein the initialization function of the platform-specific module is configured to initialize the platform, execute the initialization function of the platform-specific module during a platform-dependent phase of a kernel boot sequence for the kernel, and execute a platform-independent phase of the kernel boot sequence after executing the initialization function of the platform-specific module.

The techniques described herein may present several advantages. For example, because the kernel of the operating system does not need to include code that would support each of a variety of different platforms, the kernel of the operating system may not become bloated or oversized as a result of including such support. As another example, the platform-specific functions of the modules called by the kernel in the early bootup stage do not have to reside in the kernel and can be isolated to modules. In this manner, the kernel may include the framework to load and execute modules that may support any platform on which the operating system is installed, yet the kernel need not directly support each and every feature of these various platforms.

The details of one or more examples are set forth in the accompanying drawings and the description below. Other features, objects, and advantages will be apparent from the description and drawings, and from the claims.

DETAILED DESCRIPTION

Figure 1:
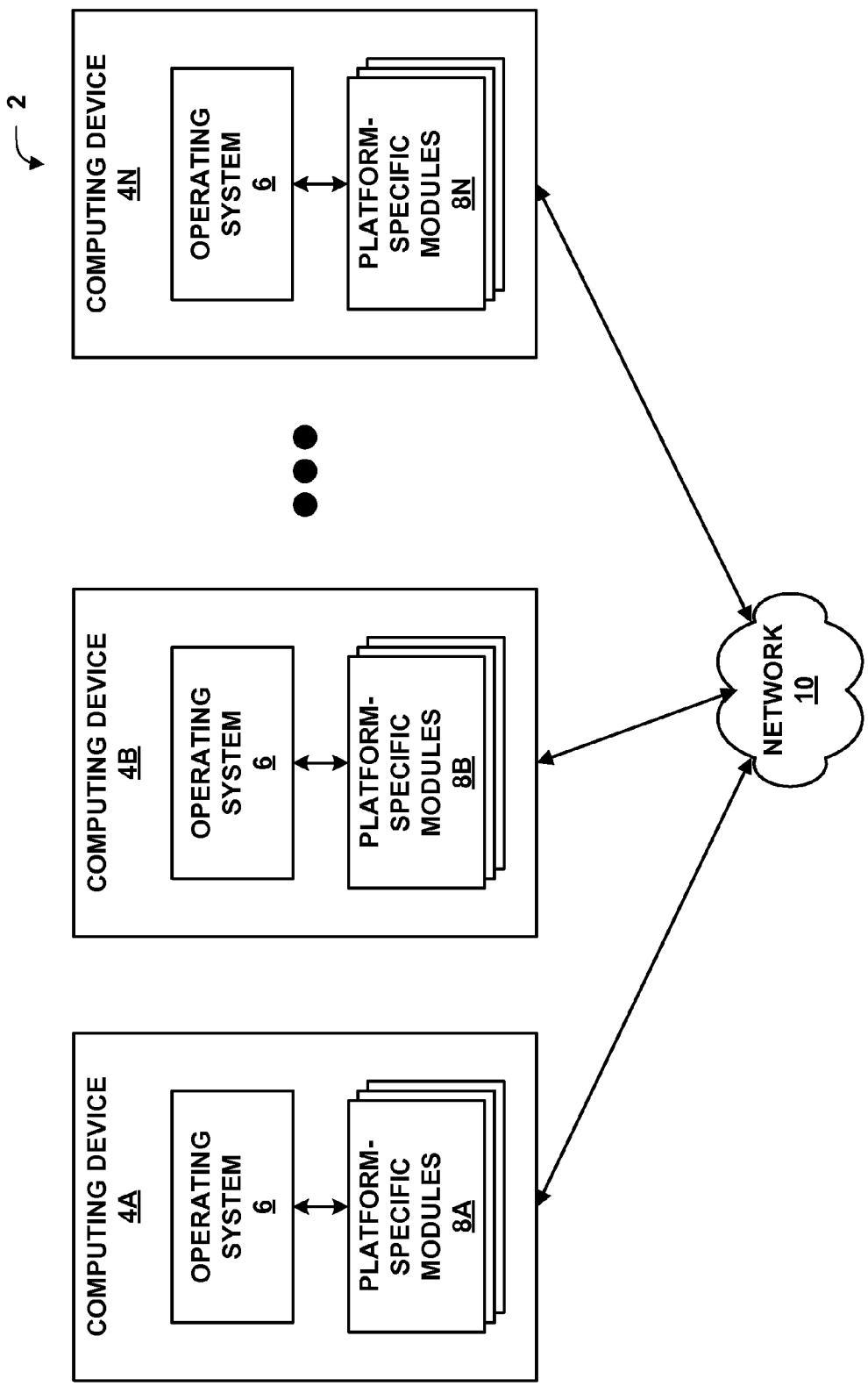
FIG. 1 is a block diagram illustrating an example system in which various computing devices, communicating through a network, each include a platform-specific module.

FIG. 1 is a block diagram illustrating an example system 2 in which computing devices 4A-4N (collectively, computing devices 4) communicate through network 10. Computing devices 4 also each include the same operating system 6. In accordance with the techniques described herein, each of computing devices 4 also includes a corresponding set of one or more platform-specific modules 8A-8N (collectively, platform-specific modules 8) that initialize the corresponding one of computing devices 4 on which the set of platform-specific modules are installed. That is, each of computing devices 4 includes one or more particular platform-specific modules 8 that are configured for initializing the corresponding one of computing devices 4. Therefore, the platform-specific modules 8 may be different among computing devices 4, such that each set of platform-specific modules 8 are customized for the particular one of computing devices 4 on which the platform-specific modules are installed.

When one of computing devices 4 is initially started, the central processing unit of the one of computing devices 4 loads and executes a boot loader, which loads a kernel of operating system 6, as well as the corresponding one or more platform-specific modules 8. This disclosure uses the term "load" to mean that corresponding instructions are written to their proper memory addresses for execution. The kernel of operating system 6 generally executes a boot-up procedure in two phases: a platform-dependent phase and a platform-independent phase. The kernel of operating system 6 executes the platform-dependent phase and the platform-independent phase in this order. During the platform-dependent phase, the kernel initializes the platform, including platform-specific features, such as particular hardware devices, a watchdog timer, a translation look-aside buffer (TLB), and/or other platform-specific features. The platform-dependent phase generally includes the initialization of a processor of the platform. That is, the platform-dependent phase may correspond to the time during which the CPU is initialized. The platform-independent phase generally corresponds to system startup tasks such as initialization processes, mounting of root filesystem, initialization of TCP/IP protocol stack, and the like.

In accordance with the techniques of this disclosure, the kernel of operating system 6 executes functions of platform-specific modules 8 during the platform-dependent phase of kernel boot-up to initialize the platform. Conventional operating systems only support modules, e.g., execution of functions provided by modules, during the platform-independent phase of kernel execution, at which time the platform has already been initialized. That is, conventional operating systems do not support execution of modules during the platform-dependent phase of kernel boot-up. Therefore, the loaded kernel of a conventional operating system must include instructions to initialize any platform on which the operating system is installed, even if those instructions are to initialize a hardware device or other feature of the platform that is not present on the particular platform on which the operating system is installed.

In accordance with the techniques of this disclosure, and contrary to conventional operating systems, the kernel of operating system 6 supports calling of functions from modules during the platform-dependent phase of kernel execution. In particular, platform-specific modules 8 may perform the initialization procedures conventionally performed by the kernel itself. Therefore, computing devices 4 may load instructions, in the form of the platform-specific modules 8, for particular features of the one of computing devices 4 and thus avoid loading instructions that may not be executed during the platform-dependent phase, such as instructions for initializing features of a different platform. In this manner, the kernel of operating system 6 may avoid becoming bloated with code that may not be executed during initialization.

As an example, computing device 4A includes platform-specific modules 8A, which are configured for computing device 4A. When computing device 4A is turned on, computing device 4A loads the kernel of operating system 6, as well as platform-specific modules 8A. Platform-specific modules 8A each include functions that initialize the "platform," i.e., computing device 4A. In this manner, the kernel of operating system 6 need not include specific code for initializing particular features of computing device 4A. Moreover, the kernel of operating system 6 need not include code for initializing particular features of any other ones of computing devices 4, such as computing device 4B, which may include hardware devices and other features not found on computing device 4A. In this manner, the base (or core?) kernel of operating system 6 may remain platform-independent, while also being able to execute functions of platform-specific modules 8A to initialize computing device 4A. Likewise, computing device 4B includes platform-specific modules 8B that are configured to initialize computing device 4B, and the platform-specific modules 8B for computing device 4B may be different than platform-specific modules 8A of computing device 4A, e.g., if computing device 4A and computing device 4B are different platforms.

Each of computing devices 4 may correspond to any type of computing device that includes an operating system. For example, any or all of computing devices 4 may be workstation computers, stand-alone computers, gaming consoles, handheld devices such as cellular phones, personal digital assistants (PDAs), or music/mp3 players, network devices such as routers, switches, servers, intrusion detection and prevention (IDP) devices, firewalls, or other devices that include an operating system. Although depicted as being connected to network 10 in the example of FIG. 1, one or more of computing devices 4 need not be connected to a network.

Figure 2:
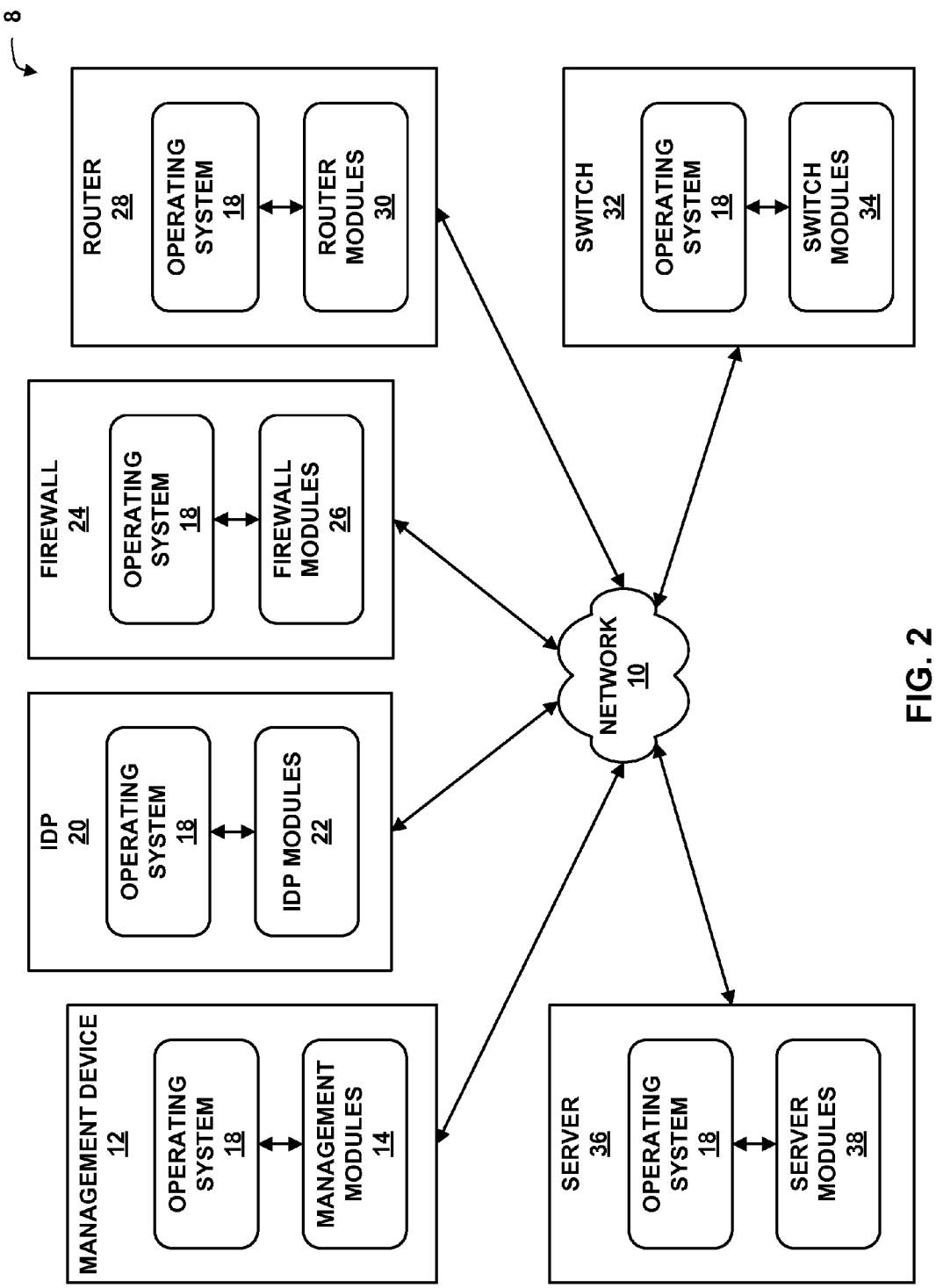
FIG. 2 is a block diagram illustrating an example system in which various network devices are configured with platform-specific modules.

FIG. 2 is a block diagram illustrating example system 8 in which various network platforms are configured with platform-specific modules. In particular, system 8 includes management device 12, IDP 20, firewall 24, router 28, switch 32, and server 36, which are interconnected by network 10. Each of these platforms includes operating system 18, which is the same on each of the platforms. Each of these platforms may correspond to one of computing devices 4 of FIG. 1. Operating system 18 interacts with platform-specific modules for each of the network platforms of FIG. 2 to perform platform-specific tasks. In the example of FIG. 2, management device 12 includes management modules 14, IDP 20 includes IDP modules 22, firewall 24 includes firewall modules 26, router 28 includes router modules 30, switch 32 includes switch modules 34, and server 36 includes server modules 38. These modules may generally be referred to herein as platform-specific modules.

In general, a platform-specific module performs platform-specific functions, e.g., during initialization of the platform. For example, a platform-specific module may initialize particular devices of the platform, such as network interface cards. In accordance with the techniques described herein, the platform-specific module executes platform-specific initialization functions during initialization of a central processing unit (CPU) or other general purpose or specialized processor of the platform, and hence before a kernel of operating system 18 is completely booted, thus during the early part of the bootup cycle of the kernel.

The platform-specific module may perform various functions for the particular platform on which the platform-specific module is installed. For example, the platform-specific module may initialize a watchdog timer of the platform. As another example, the platform-specific module may initialize a translation lookaside buffer of the platform. As another example, the platform-specific module may initialize devices of the platform, e.g., network interface cards, user interfaces, or other devices. Certain platform-specific modules may be installed on two or more different platforms. For example, a module to initialize a packet forwarding engine (PFE) may be installed on both router 28 as one of router modules 30 and on switch 32 as one of switch modules 34.

As one example of platform-specific modules, router modules 30 may set a routing engine type for router 28, initialize the routing engine of router 28, and initialize a forwarding engine of router 28. As another example, switch module 34 may initialize a forwarding engine of switch 32. As another example, IDP module 22 may initialize an application identification engine, a signature engine, a random number generator, and a protocol identification engine of IDP 20.

When operating system 18 is first installed on one of the example platforms of FIG. 2, a user, e.g., an administrator, configures a boot loader to identify one or more platform-specific modules and corresponding initialization functions provided by the platform-specific modules to be called during an early bootup stage of the kernel, which also performs CPU initialization. The platform is then ready for use.

When the platform is turned on or otherwise booted up (e.g., restarted), the loader loads the kernel of operating system 18 as well as the platform-specific modules for the platform. Upon first receiving power, the CPU retrieves instructions from a boot sector, e.g., of a computer-readable medium, that stores a location of instructions corresponding to a boot loader. During CPU initialization, the CPU retrieves and executes the boot loader instructions. The boot loader instructs the CPU to load the kernel of operating system 18 and the one or more platform-specific modules in accordance with the configuration received from the administrator. The configuration may be stored in a computer file, such as "loader.conf." Thus the administrator may modify loader.conf to configure the kernel. The CPU then executes the platform-dependent phase of the kernel of operating system 18.

As the CPU begins executing the platform-dependent phase of the kernel of operating system 18, the kernel calls the initialization function of the one or more platform-specific modules, according to the configuration from the administrator, to initialize the platform. The kernel also relocates and links the module. The kernel also builds a symbol table and resolves symbols of the platform-specific modules in the symbol table. That is, the kernel stores symbols of the platform-specific modules (e.g., function names, variable names, etc. of the platform-specific modules) and corresponding memory addresses of the symbols in the symbol table. The kernel then executes initialization functions of each of the platform-specific modules, which includes instructions to execute the particular platform on which the operating system is installed. Finally, after execution of the initialization function of the platform-specific modules, the kernel of operating system 18 executes the platform-independent phase of the kernel bootup. Operating system 18 may interact with the platform-specific modules after boot-up by referencing the symbol table.

In this manner, operating system 18 may be installed on each of the example platforms of FIG. 2, while the kernel of operating system 18 may interact with the platform-specific modules of each of the example platforms of FIG. 2. However, in this manner, the kernel of operating system 18 need not include platform-specific code for each of the platforms portrayed in FIG. 2. Therefore, the kernel of operating system 18 may occupy relatively less memory space than that of a conventional operating system, yet each of the platforms may be initialized properly, and the kernel may properly initialize and interact with devices of each of the platforms through the platform-specific modules.

The platform-specific modules of FIG. 2 may present several advantages. For example, because the kernel of operating system 18 does not need to load code that would support each of the platforms of, e.g., FIG. 2, the kernel of operating system 18 may avoid becoming bloated as a result of including such support. Operating system 18 may achieve modularity and include a smaller kernel than conventional operating systems. Operating system 18 may utilize less memory than conventional operating systems, thus achieving a smaller memory footprint in the platform. When the platform changes, or otherwise when a change to the initialization of the platform is required, only one or more of the platform-specific modules may need to be updated, rather than all of operating system 18, which would require that the kernel be updated and recompiled.

Figure 3:
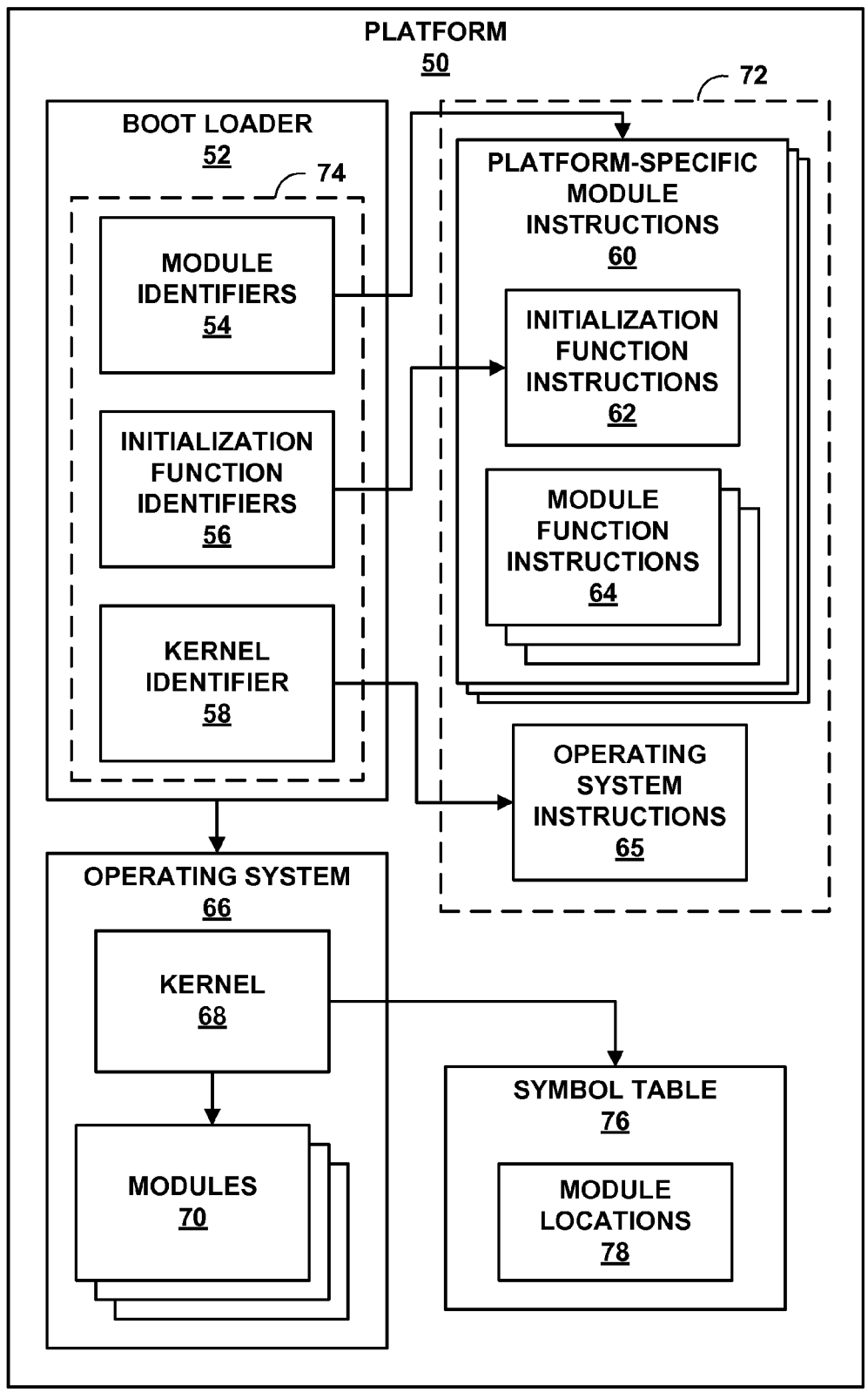
FIG. 3 is a block diagram illustrating example components used to initialize an example platform.

FIG. 3 is a block diagram illustrating example components used to initialize platform 50. Platform 50 generally may correspond to any of the devices or platforms of FIG. 1 and FIG. 2. Boot loader 52 is executed by a processor (not shown) of platform 50 when platform 50 is powered on or restarted. Instructions for boot loader 52 are stored in a boot sector of a hard drive, read only memory (ROM), or other memory of platform 50. In the example of FIG. 3, instructions 65 for operating system 66 and platform-specific module instructions 60, each set of instructions 60 corresponding to a platform-specific module, are stored on storage media 72, which may correspond to a hard drive or other storage medium.

The processor of platform 50 refers to the boot sector of storage media 72 to identify the instructions to execute boot loader 52. Each set of platform-specific module instructions 60 includes initialization function instructions 62 and instructions for one or more module functions 64. The processor executes boot loader 52 to load operating system instructions 65 into memory as operating system 66, which includes kernel 68 and one or more modules 70. Boot loader 52 also loads platform-specific module instructions 60 as one or more of modules 70. Modules 70 may also include traditional operating system modules, which are loaded and executed after the platform-dependant phase of boot-up.

In the example of FIG. 3, boot loader 52 includes identifiers 74. Identifiers 74 include a plurality of location identifiers, such as file names, to locations in storage media 72, corresponding to platform-specific module instructions 60, operating system instructions 65, and other sets of instructions such as traditional modules (not shown). Identifiers 74 also include identifiers of initialization function instructions 62 within the platform-specific module instructions 60. In one example, identifiers 74 are configured during installation of operating system 66, as described in greater detail with respect to FIG. 5. Module identifiers 54, for example, may comprise names of modules in storage media 72 corresponding to platform-specific module instructions 60. Boot loader 52 also stores initialization function identifiers 56. Initialization function identifiers 56 identify names of initialization functions corresponding to initialization function 62 within each set of platform-specific module instructions 60.

In one example, initialization function instructions 62 within one of the sets of platform-specific module instructions 60 may comprise a function named "init_module( )" Accordingly, a corresponding one of initialization function identifiers 56 identifies the initialization function of the platform-specific module instructions 60 as "init_module( )" in this example. In another example, the initialization function 62 corresponding to one set of platform-specific module instructions 60 may be named "early_boot_init( )" in which case the corresponding one of initialization function identifiers 56 identifies the initialization function of the platform-specific module instructions 60 as "early_boot_init( )" In any case, initialization function identifiers 56 generally identify initialization function instructions 62 of corresponding platform-specific module instructions 60. Kernel identifier 58 represents the file path of the kernel of operating system instructions 65 in storage media 72.

Boot loader 52 executes and loads the instructions identified by identifiers 74 from storage media 72 into main memory, such as RAM. For example, as shown in FIG. 3, boot loader 52 loads operating system instructions 65 into main memory of operating system 66. Boot loader 52 also loads each set of platform-specific module instructions 60 as one of modules 70.

Modules 70 corresponding to a set of platform-specific module instructions 60 generally perform initialization procedures for platform 50 when executed by kernel 68 during a platform-dependent boot-up phase. In particular, the initialization function instructions 62 initialize the one of the platform-specific modules along with initializing the platform, when executed by the kernel. For example, one of the platform-specific modules may initialize a network-interface card of platform 50. The initialization function instructions 62 corresponding to one of the platform-specific modules may also refer to internal module functions 64 of the corresponding set of platform-specific module instructions 60.

Kernel 68 is configured, according to the techniques of this disclosure, to execute the initialization functions 62 corresponding to each set of platform-specific module instructions 60 during a platform-dependent phase of execution. During execution of initialization function instructions 62, kernel 68 constructs symbol table 76, which provides memory location identifiers for "symbols," such as names of modules, names of functions, names of variables, or other symbols. The memory location identifiers refer to the memory locations for the instructions corresponding to the symbol when the symbol refers to a procedure or function or the value for a variable or other data object. For example, symbol table 76 includes module locations 78, which refers to the loaded memory location of the modules as modules 70. That is, module location 78 identifies the location of platform-specific module 60 as a loaded one of modules 70, e.g., in RAM, whereas module identifier 54 identifies a location of instructions for the platform-specific modules in storage media 72, e.g., in ROM or on a hard disk.

After executing the initialization function instructions 62 corresponding to each set of platform-specific module instructions 60, kernel 68 may proceed to the platform-independent phase of boot-up. Operating system 66 may also include traditional kernel modules among modules 70 with which kernel 68 may interact after execution of the platform-independent phase of boot-up. Kernel 68 also stores the memory locations of the traditional ones of modules 70 in symbol table 76 during or after kernel 68 has been initialized and after kernel 68 has initialized those modules.

Platform-specific module instructions 60 may generally include any instructions provided by the kernel during the platform-dependent phase of execution, as well as any functions implemented by module function instructions 64. During the platform-dependent phase, the kernel typically has not executed instructions that provide dynamic memory allocation functionality, such as, for example, a "malloc( )" function in C/C++. Thus, unless one or more of the platform-specific modules implements a dynamic memory allocation scheme, the platform-specific modules generally do not dynamically allocate memory using a function call such as "malloc( )" according to one aspect.

Figure 4:
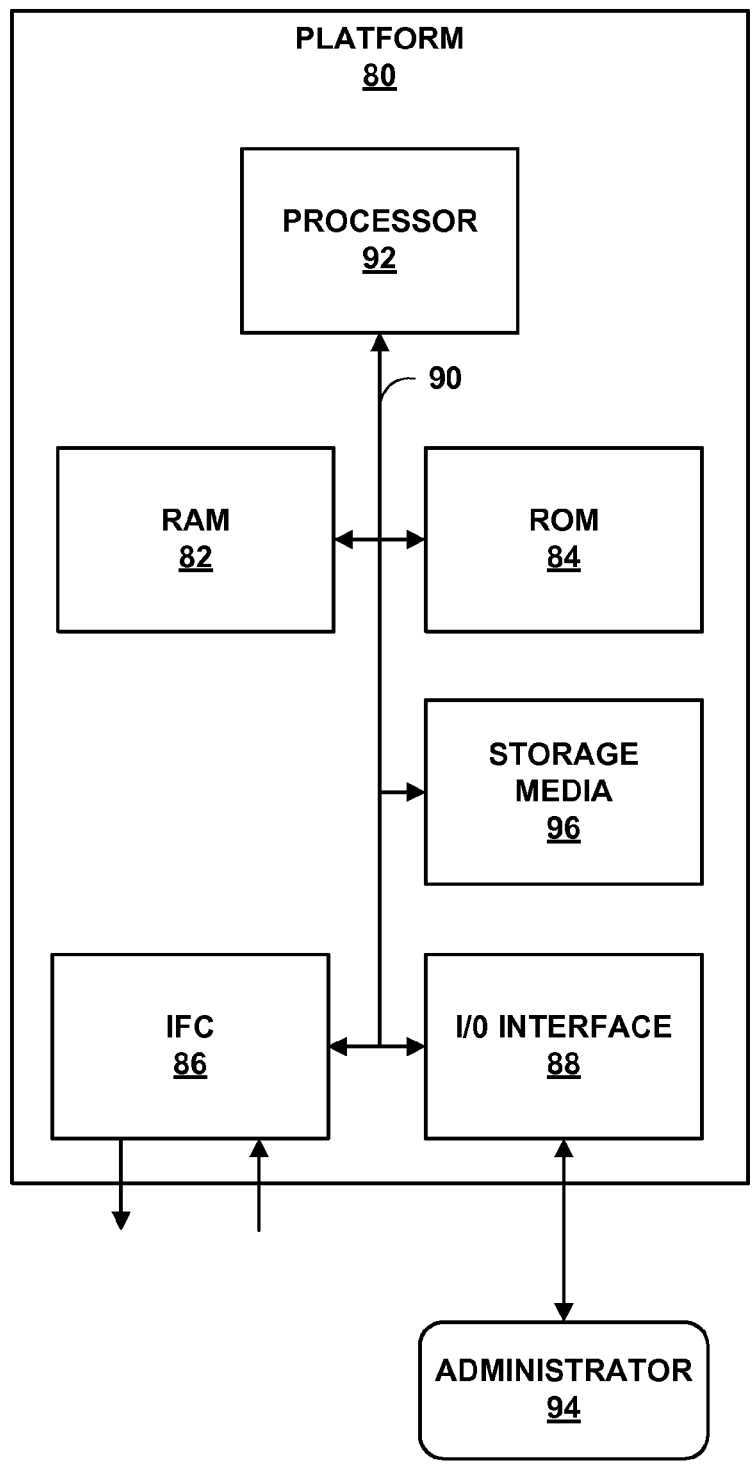
FIG. 4 is a block diagram illustrating an example platform that implements one or more of the techniques described herein.

FIG. 4 is a block diagram illustrating an example platform 80 that implements the techniques described herein. Platform 80 may correspond to platform 50, in one example, or generally any of the devices or platforms of FIG. 1 and FIG. 2. Platform 80 includes various internal devices, such as processor 92, random access memory (RAM) 82, read-only memory (ROM) 84, storage media 96, interface card (IFC) 86, and input/output (I/O) interface 88. Bus 90 interconnects each of these devices of platform 80 as well to enable these devices to communicate with each other by sending electrical signals across bus 90. Other examples may include additional devices as well, such as a plurality of IFCs, a plurality of storage media, a plurality of I/O interfaces, a plurality of internal and/or external busses, or other devices. ROM 84 may comprise read-only memory, programmable read only memory, electronically erasable programmable read only memory, or other read-only memory.

An administrator, such as administrator 94, configures platform 80 through I/O interface 88, which may be a graphical user interface (GUI), a command line interface (CLI), or other interface. Administrator 94 may also configure platform 80 remotely via a management device across a network, e.g., using SNMP, via IFC 86. In any case, administrator 94 may perform various administrative tasks on platform 80. For example, administrator 94 may install an operating system for platform 80 onto storage media 96, which may comprise, for example, a hard drive, a floppy disk, a CD-ROM, a flash drive, magnetic media, optical media, or other permanent storage media. In accordance with the techniques described herein, the administrator also installs platform-specific modules onto storage media 96. During installation of the platform-specific modules, instructions for the platform-specific modules are loaded onto storage media 96 (e.g., shown as platform-specific module instructions 60 in FIG. 3).

ROM 84 includes an identifier of the location of the bootable sector of storage media 96. When processor 92 initially receives power, processor 92 performs a processor initialization function, loaded from ROM 84. The processor initialization function causes the processor to locate the operating system instructions and the instructions for the platform-specific modules on storage media 96. The processor initialization function also loads a boot loader, which in turn loads the operating system instructions and the platform-specific module instructions into RAM 82. The platform-specific module instructions include an initialization function for the corresponding platform-specific module. The processor executes a platform-dependent phase of the kernel first that, according to the techniques of this disclosure, is configured to execute the initialization functions for each of the platform-specific modules. In one example, platform 80 may correspond to platform 50 of FIG. 3, in which case the processor initialization function would execute the functions corresponding to initialization function instructions 62 of the set of platform-specific module instructions 60. The following pseudocode provides an example of an initialization function that processor 92 may execute from RAM 82:

```
/*
 * cpu init function, called during early stages of boot up
 */
cpu_init( ) {
    ...
    /* call platform-specific module initialization during the
       early bootup */ platform_early_bootup_callback( );
    ...
}
/*
 * Lookup the platform module and call the early boot
callback function in
 * the module
 */
platform_early_bootup_callback( ) {
    ...
    P_S_Module platform_module; //create an instance of the
       platform-specific module platform_module.early_boot_init( ); //initialize the platform
    ...
}
```

The pseudocode for the class "P_S_Module" is given below. In the example, the code for P_S_Module is installed on storage media 96, rather than stored within ROM 84.

```
/*
 * platform callback function called during early stages of
bootup
 */
class_P_S_Module {
    ...
    int early_boot_init( ) {
        /* Depending on the platform, set the TLB mappings */
        if (platform==PLATFORM_ABC) {
            set_tlb_mapping_abc( );
        }
        else if (platform==PLATFORM_DEF) {
            set_tlb_mapping_def( );
        }
        /*
         * Depending on the platform set the callback that should
            be used to
         * strobe the watchdog
         */
        if (platform==PLATFORM_ABC) {
            watchdog_callback=platform_abc_watchdog;
        }
        else if (platform==PLATFORM_DEF) {
            watchdog_callback=platform_def_watchdog;
        }
    }
}
```

In an alternative example, the class P_S_Module may include generic data elements and functions that are used for initializing any platform. The class may then be extended to include platform-specific functions and data objects. For example, the base P_S_Module class may be extended to a P_S_Router_Module class that includes functions for initializing a router, a P_S_Switch_Module class that includes functions for initializing a switch, a P_S_Server_Module class that includes functions for initializing a server, a P_S_Firewall_Module class that includes functions for initializing a firewall, a P_S_IDP_Module class that includes functions for initializing an IDP, and a P_S_Mgmt_Module class that includes functions for initializing a management device. Each of these modules may be further extended to include functions or objects for a particular version of the platform; for example, the P_S_Router_Module class may be further extended to P_S_Router_Module_1, P_S_Router_Module_2, and P_S_Router_Module_3 for versions 1, 2, and 3 of a router, respectively.

In any case, the processor 92 executes the initialization function of the platform-specific module from the module instructions stored in RAM 82. The initialization function of the platform-specific module, executed by processor 92, initializes devices corresponding to the particular platform-specific module. For example, the initialization function of a first platform-specific module may initialize IFC 86 and the initialization function of a second platform-specific module may initialize I/O interface 88. The initialization function of the platform-specific module may also initialize one or more file systems of storage media 96 or other devices and features of platform 80.

After the initialization function of the platform-specific module has finished executing, processor 92 executes the remaining platform-dependent phase of the kernel of the operating system. The kernel, executed by processor 92, then executes the platform-independent phase of the initialization process by performing platform-independent initialization functions. Once the kernel has finished executing the platform-independent phase, platform 80 is ready for use.

Figure 5:
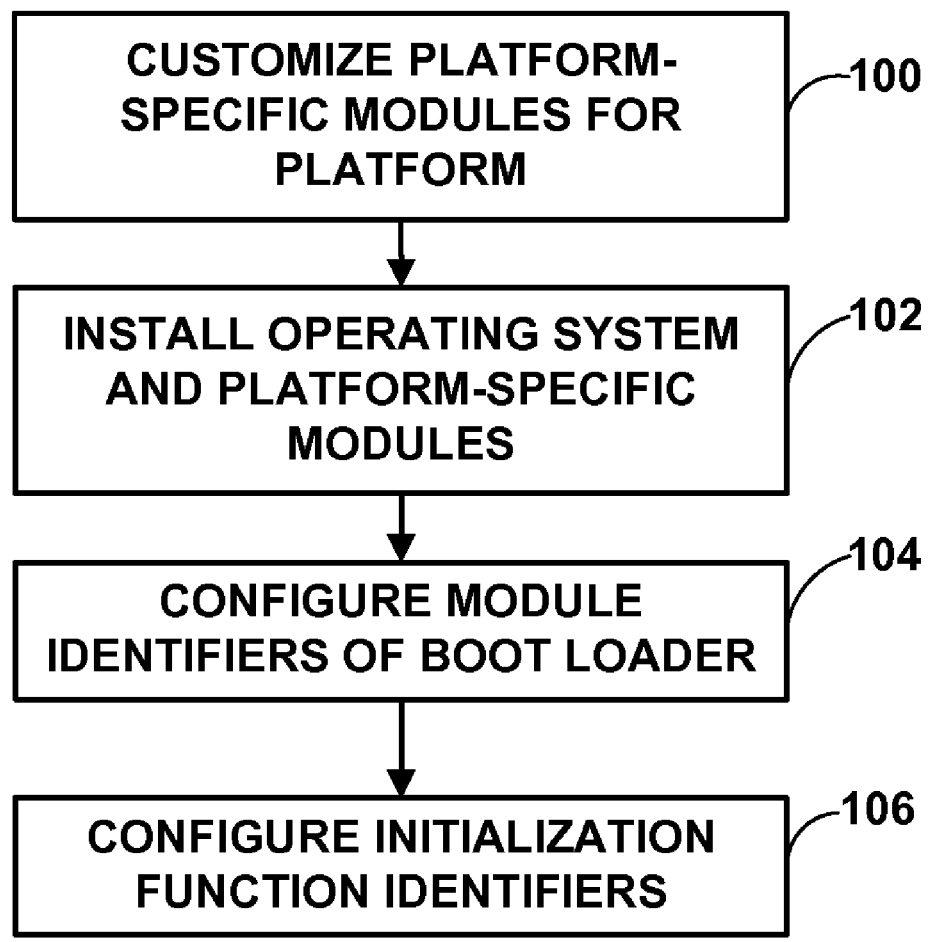
FIG. 5 is a flowchart illustrating an example method for configuring a platform.

FIG. 5 is a flowchart illustrating an example method for configuring a platform. The example method of FIG. 5 is generally performed when a platform is first configured, e.g., when the operating system of the platform is first installed, although a similar method may be performed when installing a new operating system or for updating an existing operating system or updating a platform-specific module.

Initially, a user customizes one or more platform-specific modules for the platform (100). The user also customizes an initialization function for each of the platform-specific modules for the particular platform on which the platform-specific modules are to be installed. This may be done shortly before setting up the platform, although more typically, this step will be performed concurrently with programming the operating system. This step may include, for example, customizing platform-specific modules to configure a watchdog timer for the platform, to set a configuration for a translation lookaside buffer, to initialize particular hardware devices of the platform, and other platform-specific features.

The watchdog timer is a timer that triggers a reset of the platform when the timer reaches zero. Components of the platform regularly reset the watchdog timer to keep the system alive. Therefore, when the platform experiences a freeze or a hang, the watchdog timer will enable the platform to restart. The initialization performed by the platform-specific module may initially set the watchdog timer and set a maximum value for the timer from which the watchdog timer counts down. Because different platforms include different mechanisms to reset and/or initialize the watchdog timer, and because the addresses of corresponding registers may be different on various platforms, the platform-specific module is specifically configured for the corresponding platform with, for example, the proper mechanisms and functions needed for manipulation of registers. In this manner, the initialization function of the platform-specific module does what is needed for the platform.

The translation look-aside buffer is a cache in the CPU of the platform that includes a number of page table entries that map virtual addresses onto physical addresses. The translation look-aside buffer (TLB) is used to improve the speed of translation between virtual addresses and physical addresses. The module may, for example, set up the TLB with platform specific address ranges.

This step may also be used to perform other platform-specific configuration functions. For example, when the platform is a router, the user may customize a platform-specific module to set a routing engine type and initialize a routing engine. As another example, when the platform is a switch, the user may customize a platform-specific module to initialize a forwarding engine. As another example, when the platform is an IDP platform, the user may customize a platform-specific module to initialize signatures or protocol detectors of an attack detection engine.

A user then installs the operating system and the platform-specific modules onto a platform (102). The user may be the user who customized the platform-specific module, or a separate user, e.g., an administrator of the platform. The operating system is an operating system that is designed to be installed on various platforms. A kernel of the installed operating system also recognizes modules that are used to extend the functionality of the kernel, both during the platform-dependent phase of boot-up and during and after the platform-independent phase of boot-up. During installation of the operating system, a boot loader is also installed in a bootable sector of storage media of the platform.

Next, the user configures the boot loader to load the kernel and the platform-specific modules (104). That is, the platform receives a set of location identifiers to identify locations of the platform-specific modules. Therefore, when the platform is turned on during a normal boot-up sequence, the boot loader will be able to recognize the location of the platform-specific modules. The user also configures an identifier of an initialization function of each of the platform-specific modules (106). Therefore, the boot loader will be able pass the name of the initialization function to the kernel such that the kernel may call the initialization functions of the platform-specific modules during the kernel's execution of the platform-dependent phase of boot-up.

Figure 6:
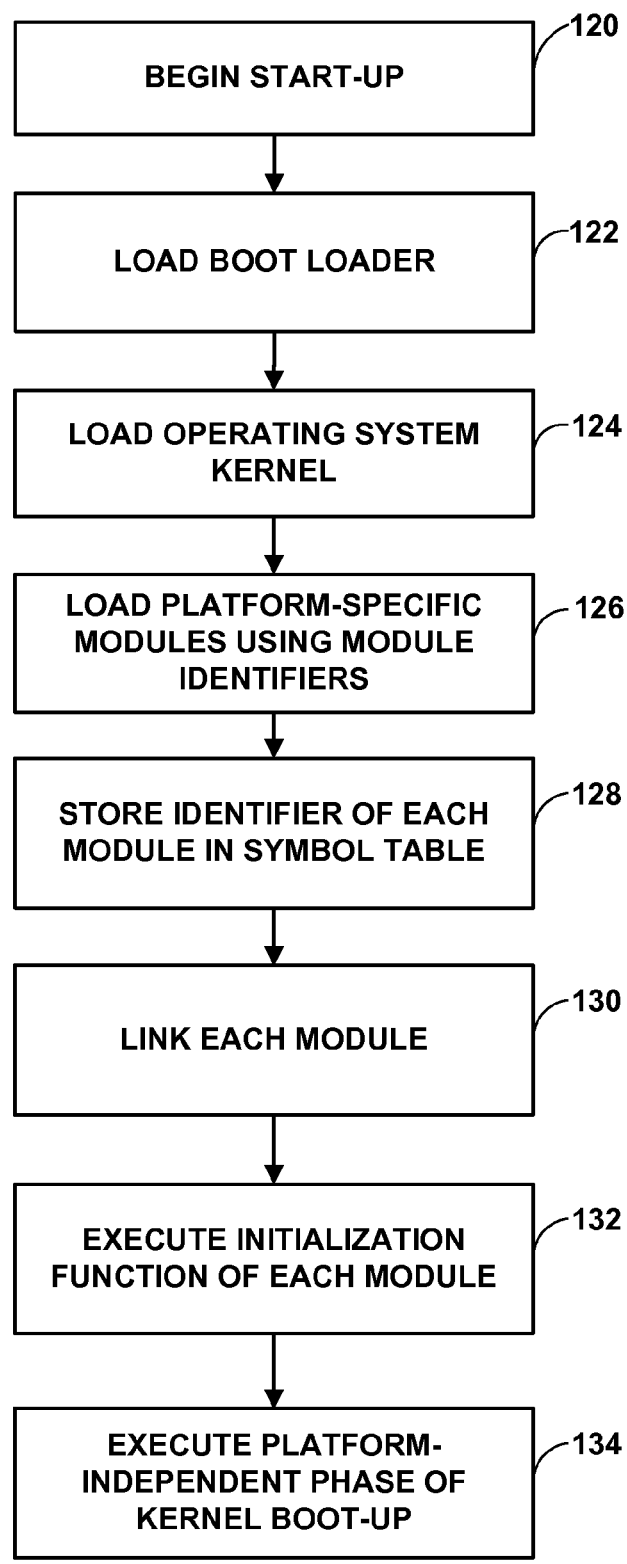
FIG. 6 is a flowchart illustrating an example method for initializing a platform when the platform is started.

FIG. 6 is a flowchart illustrating an example method for initializing a platform when the platform is started. Initially, the platform begins the start-up sequence, e.g., when a user turns the platform on or when the platform is restarted (120). During CPU initialization, a CPU of the platform reads instructions from a memory location of ROM that instructs the CPU to load a boot loader from a bootable sector of storage media of the platform (122). Accordingly, the CPU loads the boot loader from the specified memory location and executes the boot loader. In one example, the CPU executes the basic input/output system (BIOS) to load and execute the loader.

The boot loader first loads a kernel of the operating system (124). The boot loader identifies the location of the kernel from, e.g., kernel identifier 58 (FIG. 3). A computer file, such as "loader.conf," may include a configuration that identifies the location of the kernel in storage media for the boot loader. In this manner, loader.conf may provide the location (file path) of the kernel in the storage media. In some examples, one or more environmental variables in loader.conf may identify platform-specific modules, and/or initialization functions thereof, to load and execute. The boot loader then retrieves each instruction of the kernel and copies the instructions for the kernel to main memory, e.g., according to the configuration. In one example, the loader may use a configuration established according to the method described with respect to FIG. 5.

The boot loader then loads each set of platform-specific module instructions (126). The boot loader identifies the set of instructions for each platform-specific module, e.g., using platform-specific module identifiers 54 (FIG. 3). The boot loader then passes control to the kernel. The kernel constructs a symbol table and stores identifiers of the platform-specific modules in the symbol table (128). The kernel also links each of the platform-specific modules (130). That is, when a platform-specific module is written, memory references within functions of the module are relative to the first instruction having an address of "0," according to one aspect. The relocation phase modifies these memory references relative to the memory location of the module as loaded. This procedure is also known as relocation. The kernel then executes initialization functions of each of the platform-specific modules (132). The initialization functions initialize devices and features specific to the platform, as described above.

After the initialization function of the platform-specific module has finished, the kernel of the operating system performs the platform-independent phase of boot-up (134). The platform-independent phase causes the platform to finally become operational. The platform-independent phase includes operations that are universal among platforms on which the operating system is installed. For example, the platform-independent phase includes providing memory allocation functionality to processes executing over the operating system. The kernel may access the module functions provided by the platform-specific modules by referring to the symbol table to identify the locations of these module functions. Therefore, the kernel may receive instructions through APIs from processes of the platform that request access to, e.g., hardware devices specific to the platform (for example, particular IFCs, I/O interfaces, or other devices), or other features of the platform.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied in a computer-readable medium, such as a computer-readable storage medium, containing instructions. Instructions embedded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
loading a kernel of an operating system of a platform during initialization of a processor of the platform;
loading an initialization function of a platform-specific module during initialization of the processor of the platform, wherein the initialization function of the platform-specific module is configured to initialize at least a portion of the platform;
executing, by the kernel, the initialization function of the platform-specific module during a platform-dependent phase of a kernel boot sequence for the kernel; and
executing, by the kernel, a platform-independent phase of the kernel boot sequence after executing the initialization function of the platform-specific module.

2. The method of claim 1, further comprising loading the platform-specific module after loading the kernel and before loading the initialization function of the platform-specific module.

3. The method of claim 1, further comprising:
relocating the platform-specific module to a memory location according to a configuration of the kernel of the operating system; and
storing a memory address of the platform-specific module in a symbol table for use by the kernel.

4. The method of claim 1, further comprising receiving a configuration that specifies a location of the platform-specific module in a storage media.

5. The method of claim 4, wherein loading an initialization function of a platform-specific module comprises identifying the initialization function of the platform-specific module from the location specified by the configuration.

6. The method of claim 4, wherein receiving a configuration comprises receiving a configuration that further identifies a location in the storage media of the initialization function of the platform-specific module.

7. The method of claim 6, wherein loading an initialization function of a platform-specific module comprises loading the initialization function identified by the configuration from the storage media.

8. The method of claim 1, wherein executing the initialization function comprises initializing a watchdog timer of the platform that resets the platform when the watchdog timer counts down to zero.

9. The method of claim 1, wherein executing the initialization function comprises initializing a translation look-aside buffer of the platform that, when used by the kernel, maps virtual addresses of memory to physical addresses of memory.

10. A device comprising:
a computer-readable medium that stores instructions for a platform-specific module comprising an initialization function, and instructions for an operating system comprising a kernel, wherein the kernel is configured to execute a boot sequence comprising a platform-dependent phase and a platform-independent phase; and
a processor to execute instructions stored in the computer-readable medium,
wherein the processor executes the initialization function of the platform-specific module to initialize the device during the platform-dependent phase of the kernel boot sequence, and
wherein the processor executes the platform-independent phase of the kernel boot sequence after executing the initialization function of the platform-specific module.

11. The device of claim 10, further comprising an interface card, wherein the processor executes the initialization function of the platform-specific module to initialize the interface card.

12. The device of claim 10, further comprising an input/output interface, wherein the processor executes the initialization function of the platform-specific module to initialize the input/output interface.

13. The device of claim 12, wherein the device receives a configuration from a user through the input/output interface, wherein the processor stores the configuration in the computer-readable medium, and wherein the configuration identifies a location of the platform-specific module and identifies the initialization function of the platform-specific module.

14. The device of claim 10, wherein the processor constructs a symbol table and stores the symbol table in the computer-readable medium, wherein the symbol table includes symbols corresponding to the platform-specific module and memory addresses for the symbols.

15. The device of claim 10, wherein the processor executes the initialization function of the platform-specific module to initialize at least one of a watchdog timer and a translation look-aside buffer of the device.

16. A non-transitory computer-readable medium comprising instructions for causing a programmable processor of a computing platform to:
load a kernel of an operating system of the computing platform during initialization of the programmable processor from a computer-readable medium of the computing platform;
load an initialization function of a platform-specific module during initialization of the programmable processor, wherein the initialization function of the platform-specific module is configured to initialize the computing platform;

execute the initialization function of the platform-specific module during a platform-dependent phase of a kernel boot sequence for the kernel; and execute a platform-independent phase of the kernel boot sequence after executing the initialization function of the platform-specific module.

17. The non-transitory computer-readable medium of claim 16, further comprising instructions for causing the programmable processor to relocate the platform-specific module to a location of the computer-readable medium according to a configuration of the kernel of the operating system and to store a memory address of the platform-specific module in a symbol table for use by the kernel.

18. The non-transitory computer-readable medium of claim 16, further comprising instructions for causing the programmable processor to receive a configuration that specifies a location of the platform-specific module in the computer-readable medium of the computing platform.

19. The non-transitory computer-readable medium of claim 18, wherein the instructions to load an initialization function of a platform-specific module further comprise instructions to identify the initialization function of the platform-specific module from the location of the computer-readable medium of the computing platform specified by the configuration.

20. The non-transitory computer-readable medium of claim 18, wherein the instructions to receive a configuration further comprise instructions to receive a configuration that identifies the initialization function of the platform-specific module in the computer-readable medium of the computing platform.

21. The non-transitory computer-readable medium of claim 16, wherein the instructions to execute the initialization function comprise instructions to initialize a watchdog timer of the computing platform that resets the computing platform when the watchdog timer counts down to zero.

22. The non-transitory computer-readable medium of claim 16, wherein the instructions to execute the initialization function comprise instructions to initialize a translation lookaside buffer of the computing platform that maps virtual addresses of memory to physical addresses of memory.

* * * * *